Nov. 2, 1965  D. R. HOUGH  3,215,184

VEHICLE TIRE ANTI-SKID TREAD

Filed June 19, 1964

INVENTOR.
DEAN R. HOUGH
BY
his ATTORNEY

United States Patent Office

3,215,184
Patented Nov. 2, 1965

3,215,184
VEHICLE TIRE ANTI-SKID TREAD
Dean R. Hough, Pittsburgh, Pa., assignor, by direct and mesne assignments, of one-fourth interest to George W. Kendall, Wheeling, W. Va., and one-half to Washington Rubber Company, Washington, Pa., a partnership
Filed June 19, 1964, Ser. No. 376,382
2 Claims. (Cl. 152—211)

This invention relates to pneumatic vehicle tires and, more particularly, to an anti-skid tread composition therefor.

An outstanding disadvantage of commonly used anti-skid particles in pneumatic vehicle tires, such as wood, cornhusks, and similar fibrous materials, is that they absorb moisture, therefore, as a consequence of molding in dies, steam pockets tend to form which tend to cause separation of the tread layer from the base layer of the tire while in use.

Another disadvantage is that these particles do not have good wearing or abrasive quality and tend to char or at least change characteristics when subjected to intense heat, such as caused by summer driving on hot roadways.

Still a further disadvantage of such compositions is that when the particles drop out, they leave large somewhat rounded holes which do not have satisfactory anti-skid properties.

An object of the present invention is to provide a novel anti-skid composition suitable for new vehicle tires, as well as recaps or camelback tread rubber therefor, which will overcome the above-named disadvantages and which will have extremely high anti-skid qualities which will remain constant even after considerable wear of the tread rubber.

A more specific object of the invention is to provide wear-resistant, moisture-proof, fibers of short length in a tread composition for vehicle tires, such as, for example, fiber glass, so as to withstand intense heat without development of moisture and resulting air pockets, and which will present substantially the same type of anti-skid surface regardless of the depth or wear of the tread rubber.

A still further object of the invention is to provide a novel anti-skid tread for vehicle tires having considerably longer life than heretofore and maintaining more constant anti-skid qualities than heretofore possible.

Figure 1:
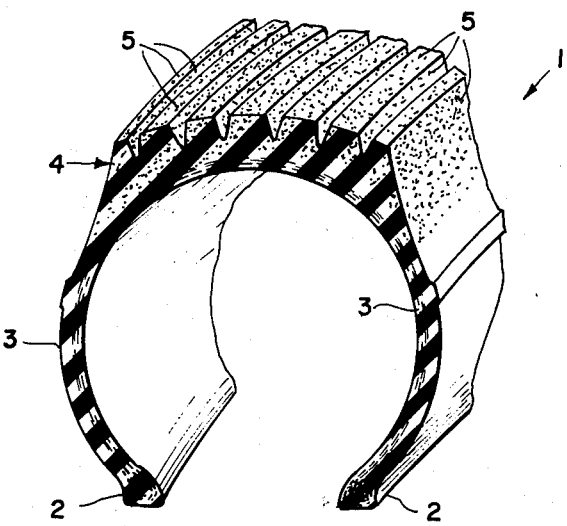
Figure 2:
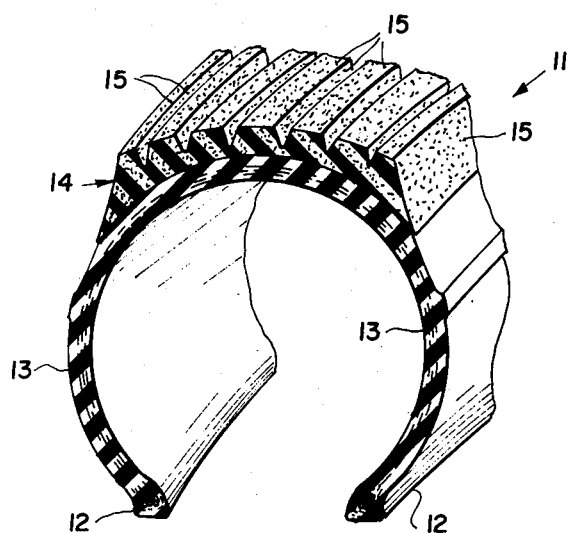

Other objects of the invention will become more apparent from the following description taken with the accompanying drawing wherein:

FIG. 1 is a perspective, fragmentary cross-section of a new vehicle tire having anti-skid particles embodying the present invention; and FIG. 2 is a fragmentary cross-sectional view of an old tire which has been recapped by camelback having anti-skid particles embodying the present invention.

Recent statistics indicate that about 40,000 people are killed annually in this country from auto accidents, of which about 18% occur as the result of rain-slick roads. Anti-skid particles presently used have shortcomings on rain-slick roads since the particles do not afford sufficient gripping or traction on the roadway to permit sudden stoppage of the vehicle.

I have made the discovery, not heretofore realized, that anti-skid qualities, particularly on wet roadways, can be substantially improved by forming a plurality of very small slits, perferably random oriented, throughout the entire depth of the tread rubber. Such slits, however, must be exceedingly small in diameter, that is of hair-like proportions, since the slits at the surface will open up considerably inside as a consequence of traction of the outer surface of the tread with respect to the roadway. Such small slits provide numerous sharp edges which function somewhat as cleats that grip the road, much the same way as a grooved new tread, but more effectively since the number of sharp edges is considerably more numerous than large grooves in a new tread design.

In accordance with the present invention, extruded fiber glass anti-skid particles are used in the form of strands of relatively short length, preferably about ¼ inch long, but in some cases up to about ½ inch long, and of about ¹⁄₆₄ inch diameter, but which may range up to about ¹⁄₃₂ inch diameter. The fiber glass strands are preferably random oriented and thoroughly mixed and uniformly distributed in the rubber composition while in fluid state during the making of the tread rubber.

While strands of the fiber glass are preferred, in some instances, other shapes may be used, such as very small particles having many corners for example, rectangular, polygonal or star-shaped to provide numerous sharp edges acting as cleats for improving traction.

Referring to FIG. 1 of the drawing, numeral 1 generally denotes a fragmentary portion of a new vehicle tire having edge portions 2, sidewalls 3, and a tread portion 4, which tread portion is provided with numerous particles 5 of fiber glass strands.

FIG. 2 is a fragmentary cross-sectional view of a recaped tire having edge portions 12, sidewalls 13 and a camelback or tread layer 14 provided with randomly dispersed fiber glass strands 15.

The fiber glass strands or particles themselves will project outwardly of the outer surface of the tread rubber when newly fabricated. Throughout the life of the tires they will give excellent traction qualities, since fiber glass is tough, strong and resists abrasion as well as extreme temperatures, such as temperatures of the order of 300° F. during molding of the rubber, or perhaps even higher temperatures when driving on a hot roadway. Since fiber glass has high temperature resistance, its characteristics will not change when subjected to very high temperatures. Moreover, as the result of wear of the tread rubber, certain of the fiber glass fibers or strands will drop out from the outer surface and in so doing will leave slits of extremely small cross-section uniformly distributed throughout the entire tread surface. These slits will provide numerous sharp edges forming cleats which improve traction, particularly on rain-covered or snow-covered roads.

The range of proportions, by weight, of fiber glass to tread rubber are from approximately 3 pounds fiber glass to 200 pounds tread rubber (for summer driving on wet roads) to approximately 5 pounds of fiber glass to 200 pounds tread rubber (for maximum traction winter driving).

Thus, it will be seen that I have provided an efficient anti-skid tread composition for vehicle tires having remarkably high anti-skid qualities and which maintains such qualities at a substantially constant value regardless of the depth or wear of the tread, which particles act essentially as cleats and leave, when dropping out, grooves of exceedingly small cross-section forming a multiplicity of sharp corners and edges for improving traction.

While I have illustrated and described a single specific embodiment of my invention, it will be understood that this is by way of illustration only, and that various changes and modifications may be made within the contemplation of my invention and within the scope of the following claims.

I claim:
1. A pneumatic vehicle tire rubber tread comprising thoroughly mixed and uniformly dispersed, very small particles of fiber glass distributed throughout the depth of the tread in the ratio of at least 2 pounds of fiber glass to about 200 pounds of tread rubber, there being, as the result of falling out of said particles from the tread surface, uniformly dispersed, very small slits of extremely small cross-section of hair-like proportions providing numerous very small and sharp edges forming cleats which improve traction, particularly on rain-covered or snow-covered roads.

2. A pneumatic vehicle tire rubber tread as recited in claim 1 wherein the fiber glass is in the ratio of about 5 lbs. fiber glass to 200 pounds of tread rubber.

References Cited by the Examiner
UNITED STATES PATENTS

| | | | |
|---|---|---|---|
| 2,184,326 | 12/39 | Thomas | 152—355 |
| 3,080,907 | 3/63 | Barrett | 152—367 |
| 3,095,027 | 6/63 | Weber | 152—355 |

ARTHUR L. LA POINT, *Primary Examiner.*